Figure 1:
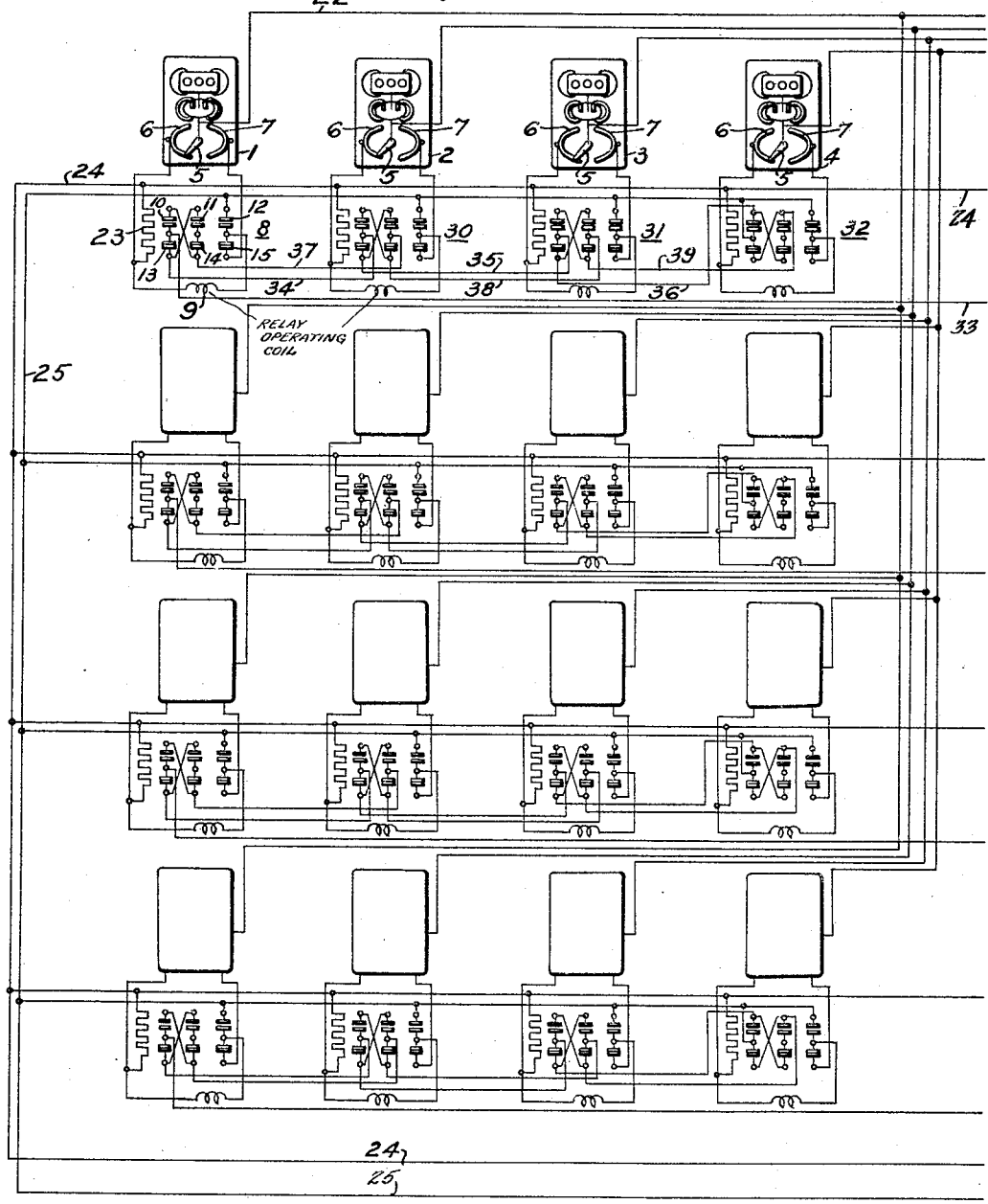

Aug. 16, 1932.  G. G. WAITE  1,872,370
DEMAND TOTALIZER
Filed Dec. 24, 1927    2 Sheets-Sheet 1

INVENTOR
Griffin G. Waite
BY
ATTORNEY

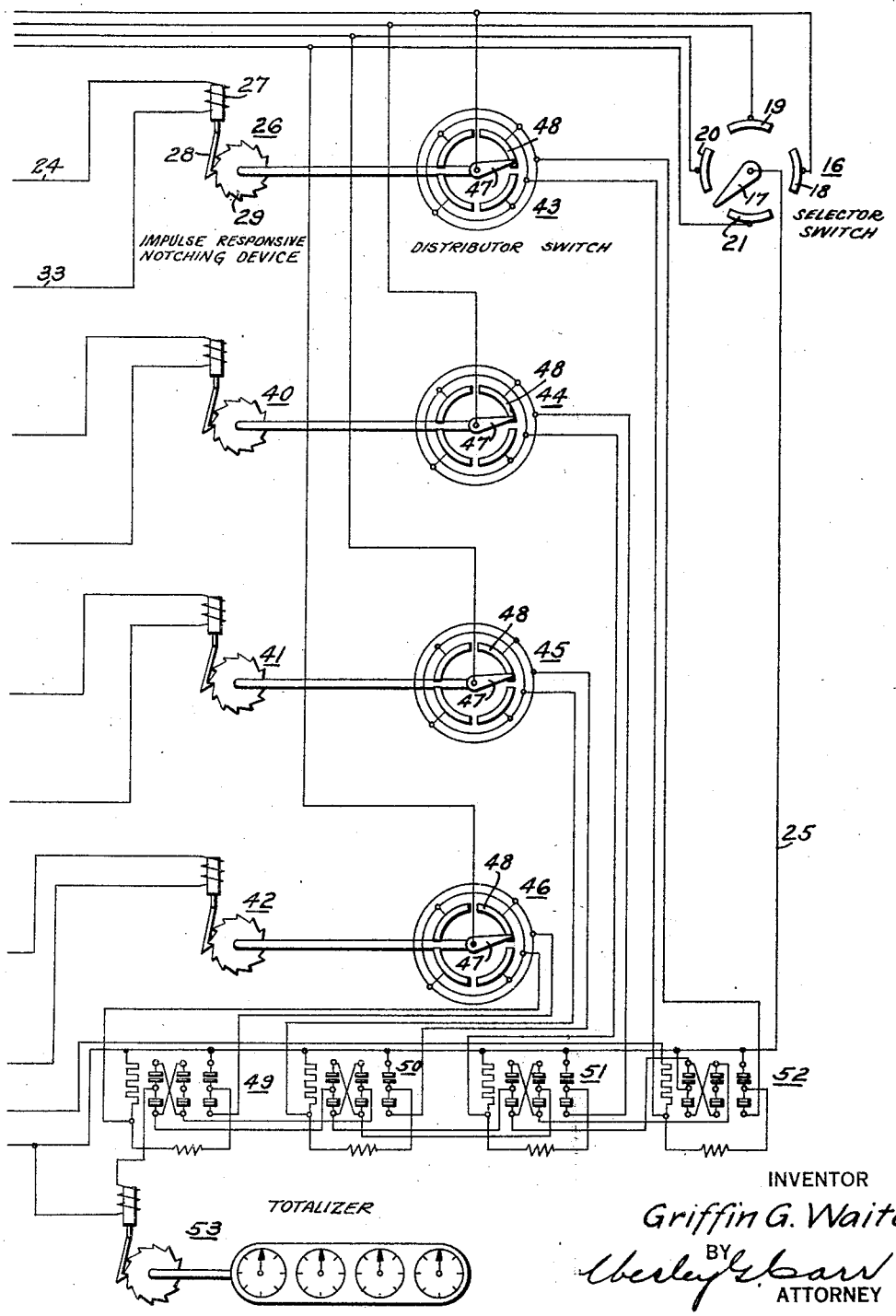

Patented Aug. 16, 1932

1,872,370

UNITED STATES PATENT OFFICE

GRIFFIN G. WAITE, OF TORONTO, ONTARIO, CANADA, ASSIGNOR TO WESTINGHOUSE ELECTRIC & MANUFACTURING COMPANY, A CORPORATION OF PENNSYLVANIA

DEMAND TOTALIZER

Application filed December 24, 1927. Serial No. 242,511.

This invention concerns a method of totalizing the electrical-power demand on a plurality of feeders. More particularly, my invention is designed to provide means for totalizing the readings of a plurality of watthour meters.

It is the object of this invention to provide means whereby the readings of any number of watthour meters may be totalized upon a single meter.

A further object of my invention is to provide a totalizing device which will be compact in construction, neat in appearance, and relatively inexpensive to manufacture.

Another object of the invention is to provide a totalizing system which will register accurately the operation of all the meters to be totalized, without omission or duplication of operations.

In accordance with my invention, I arrange a plurality of meters in groups, and provide each meter with a circuit-controlling device and a relay controlled thereby. The relays associated with each group of meters are connected in a chain, in series with a notching device which collects the operations of the meters in the group by the operation of the relay chain, in response to the circuit-controlling devices actuated by the several meters.

The operations of the notching devices are reduced to submultiple of the total number of operations and transmitted to a single relay chain common to all the relay groups, which transmits impulses to the actuating device of the main totalizer. By my system, it is thus possible to totalize the readings of a large number of meters by employing a minimum number of auxiliary devices.

My invention may be more completely understood by reference to the accompanying drawings, Figure 1 of which is a diagram illustrating the meters, relays and circuits employed by my invention; and Fig. 2 illustrates schematically the totalizing devices.

Referring to Fig. 1 of the drawings, a plurality of watthour meters 1, 2, 3 and 4 are connected to electrical circuits, the demand on all of which is to be totalized. These watthour meters are standard instruments, with the exception that each is provided with a contact arm 5, driven by the rotating element of the meter, and a pair of fixed contacts 6 and 7, adapted to be engaged by the moving contact arm 5.

Associated with each watthour meter is a relay which is indicated generally at 8. These relays are comparatively small devices, and a considerable number of them may be mounted in a small case. The relay 8 is provided with an operating coil 9 and a plurality of contacts 10 to 15, inclusive. The contacts 10, 11 and 12 are open when the coil 9 is de-energized and, at the same time, the contacts 13, 14 and 15 are closed. Energization of the coil 9 closes the contacts 10 to 12 and opens the contacts 13 to 15. The relay is designed so that contacts 13 and 14 are broken before contacts 10 and 11 are engaged, and contact 12 is closed before contact 15 is opened.

The operation of the relay 8 is controlled by the contact arm 5 of the watthour meter 1, in cooperation with a selector switch, indicated generally at 16 on sheet 2. This selector switch 16 comprises a moving contact arm 17 and a plurality of fixed contacts 18 to 21, inclusive, adapted to be successively engaged thereby.

The contact arm 5 of the watthour meter 1, when it engages the contact 7, connects one end of the operating coil 9 to the contact 18 of the selector switch 16, the circuit being from one end of the coil 9, through the contact 15, closed when the relay is de-energized, through contact 7, contact arm 5 and conductor 22, to contact 18. The other end of the coil 9 is connected, through a resistor 23, to the positive control bus 24.

The selector switch 16 is driven by any suitable means, at a rate such that the contact arm 17 makes a complete revolution between successive engagements of the contact arm 5 of the watthour meter 1, with the contacts 6 and 7, when the meter is rotating at its maximum speed. By this means, every operation of the contact arm 5 is effective through the selector switch 16 to actuate a totalizing device, in a manner to be hereinafter described, and it is impossible for the arm 5 to engage either of the contacts 6 and 7 before the selector switch has operated to complete the relay circuit, in response to the previous engagement of the arm 5 with the other contact.

When the contact arm 5 engages the contact 7 to set up the circuit above traced, the subsequent engagement of the contact 18 by the moving contact arm 17, which is connected to the negative control bus 25, will result in the energization of the operating coil 9. As above stated, the energization of the operating coil 9 causes contacts 10, 11 and 12 to close and contacts 13, 14 and 15 to open. The closing of the contact 12 completes a locking circuit for the operating coil 9 as follows, from the positive control bus 24, through resistor 23, coil 9, contact 12 and thence to the negative bus 25. As a result of the establishment of this circuit, the relay contacts are locked in the upper position until the coil 9 is de-energized.

When the contact arm 5 of the watthour meter 1, in its continued rotation, engages the contact 6, the coil 9 is shunted by a circuit from the connection between the resistor 23 and coil 9 through contact 6, contact arm 5, conductor 22, contact 18, contact arm 17, and thence to the negative control bus 25 and the other end of coil 9, which is thereupon de-energized. Thus, it is obvious that the operation of the watthour meter 1 causes the contact arm 5 alternately to engage the contacts 6 and 7, with the result that the coil 9 is successively energized and shunted to control the relay 8 and its contacts 10 to 15, in the manner just described. The operation of the selector switch 16 is such that, when a circuit is set up by the engagement of the contact arm 5 with the contact 6 or the contact 7 of meter 1, the said circuit will be completed by the engagement of the moving contact arm 17 with the fixed contact 18 of the selector switch 16.

In addition to controlling the operation of the relay 9, the selector switch 16, in cooperation with contacts 5, 6 and 7 of the watthour meters 2, 3 and 4, also serves to control the operation of the relays associated with the latter meters in a similar manner.

The relays associated with the watthour meters 1 to 4 are so connected in a chain, in a manner to be described in detail later, as to control the circuit to a notching device 26 (see Fig. 2).

The notching device 26 consists of a solenoid 27, a pawl 28 attached thereto and a ratchet wheel 29 adapted to be rotated step by step by the operation of the pawl 28.

The circuit, including the relays of the watthour meters 1 to 4, inclusive, and the solenoid 27 of the notching device 26, is such that, upon the operation of any relay in the chain, the circuit condition is altered from that existing prior to the operation of said relay. If, for example, the circuit to the notching device 26 is open, the operation of any relay in the chain, whether to close its upper contacts or its lower contacts, as a result of the energization or de-energization, respectively, of its operating coil 9 will serve to close the circuit to the notching device 26. If the circuit to the notching device 26 is closed, however, any operation of any relay will result in the opening of the circuit. This method of operation is obtained by the circuit connections about to be described in detail.

The relays associated with the watthour meters 1 to 4 are identical, and the connections of the various contacts thereof are similar, in many respects, except in the case of relay 32, as will be explained in detail below. In all the relays, contact 10 is permanently connected to the contact 14, and, likewise, the contact 11 is permanently connected to the contact 13.

The contact 12 of each relay is connected to the negative bus 25, while the resistor 23, associated with each relay, is connected to the positive bus 24. One terminal of the coil 9 of each relay is connected to its resistor 23, and the other terminal of coil 9 is connected to the transfer point between contacts 12 and 15. One terminal of the solenoid 27 of the notching device 26 is connected to the positive bus 24, and the other terminal of the solenoid is connected to the transfer point between contacts 10 and 13 of the relay 8.

In addition to the connections above mentioned, the relay contacts are also inter-connected as follows. The contact 13 of the relay 8 is connected to the transfer point between the contacts 10 and 13 of the relay 30. The contact 14 of the relay 8 is similarly connected to the transfer point between contacts 11 and 14 of the relay 30.

The relay 30 is connected to the relay 31 associated with watthour meter 3 in exactly the same manner that relay 8 is connected to relay 30. The connections between the relay 31 and relay 32 associated with watthour meter 4, however, are slightly different.

The contact 13 of the relay 31 is connected to the contact 10 of the relay 32, and the contact 14 of the relay 31 is connected to the contact 11 of the relay 32. The transfer point between contacts 10 and 13 of the relay 32 is connected to the negative bus 25.

The operation of the watthour meters 1 to 4, their associated relays and the notching device 26, will now be described in detail.

Assuming first that the contact arm 5 of all the watthour meters is in the neutral position between the contacts 6 and 7 and that all relays are de-energized, the circuit from the positive bus 24 through the solenoid 27 to the negative bus 25 will be open in the relay chain because of the fact that contacts 10 and 11 of the relay 32 will be open. The circuit from the solenoid 27 through the relay chain, when all relays are de-energized, is as follows: from the solenoid 27, by conductor 33, to the transfer point between contacts 10 and 13 of relay 8, through contact 13 of relay 8, conductor 34 to the transfer point between contacts 10 and 13 of relay 30, contact 13 of relay 30, by conductor 35 to the transfer point between the contacts 10 and 13 of the relay 31, through the contact 13 of the relay 31 and conductor 36 to the contacts 10 and 14 of the relay 32.

The contacts 10 and 11 of relay 32 being open, the circuit of solenoid 27 is de-energized.

Consider now that a load is placed on the circuit to which the watthour meter 1 is connected and that the contact arm 5 engages contact 7. The operation sets up a circuit through the coil 9, in the manner previously described, the circuit being closed by the operation of the selector switch 16 when the arm 17 engages the contact 18 thereof. When the coil 9 of the relay 8 is energized by the engagement of the contact 18 by contact arm 17, the contacts 10 to 12 become closed and the contacts 13 to 15 become opened, and a locking circuit is completed for the coil 9 through the contact 12, as already described.

The operation of the relay 8 closes its contacts 10 to 12 and opens its contacts 13 to 15, causing the circuit including the solenoid 27 to be closed. This circuit is as follows: from the positive bus 24 through the solenoid 27, conductor 33 to the transfer point between contacts 10 and 13 of relay 8, through the contact 10 to the conductor 37, to the transfer point between the contacts 11 and 14 of the relay 30, thence through the contact 14 to conductor 38 to the transfer point between the contacts 11 and 14 of relay 31, through contact 14 of relay 31 to the conductor 39 and thence to contact 13 of relay 32, through the contact 13 and thence to the negative bus 25. The circuit through the solenoid 27 of the notching device 26 being completed, the latter is energized to operate the distributor switch 43 driven by the ratchet wheel 29.

The operation of any other relay in the chain will cause the circuit through the solenoid 27 to be opened. Suppose, for example, that the contact 5 of the watthour meter 2 now engages the contact 7 thereof. In the manner already described, the relay 30 is energized to close its upper contacts and open its lower contacts. The circuit through the solenoid 27, when traced, will now be found to be open. This circuit extends from the positive bus 24 through the solenoid 27 to conductor 33, thence to the transfer point between the contacts 10 and 13 of relay 8. Since the coil 9 of relay 8 remains energized, the contact 10 is closed, and the circuit includes said contact, and conductor 37 by which it proceeds to the transfer point between contacts 11 and 14 of the relay 30. The relay 30, also being energized, the circuit extends from the conductor 37, through the contact 11 of the relay to the conductor 35, thence to the transfer point between contacts 10 and 13 of the relay 31. The relay 31, being de-energized, the circuit includes the contact 13 thereof, the conductor 36 and proceeds to the contacts 10 and 14 of the relay 32. The contacts 10 and 11 of the relay 32, however, are open under these conditions, and the circuit through the solenoid is, therefore, de-energized.

The operation of the watthour meter 3 to cause engagement of contacts 5 and 7 thereof, serves to energize the coil 9 of the relay 31, resulting in the closure of the circuit through the solenoid 27, in the manner described in connection with the relay 8 and 30. Similarly, the energization of the relay 32 causes the circuit again to be opened. Not only is the circuit condition changed by the energization of the various relays, but, also, when the same relays are de-energized, similar changes occur in the circuit through the solenoid 27.

Assume that all the relays are energized and that, as above stated, the circuit through the solenoid 27 is open. If the contact arm 5 of the watthour meter 1 now engages the contact 6, the coil 9 of the relay 8 will be de-energized, since it is shunted by the circuit including the contact 6, contact arm 5 of the watthour meter 1, and the contact 18 and contact arm 17 of the collector switch 16. The de-energization of the coil 9 of the relay 8 causes the contacts 10, 11 and 12 to open and the contacts 13, 14 and 15 to close. If the upper contacts of all the other relays are closed and the lower contacts open, the circuit from the positive bus 24 through the solenoid 27 extends, by means of the conductor 33, to the transfer point between the contacts 10 and 13 of the relay 8. Thence, the circuit extends through the contact 13 over conductor 34 to the transfer point between the contacts 10 and 13 of the relay 30. The upper contact 10 of the relay 30 being closed, the circuit includes said contact 10, the conductor 38, connected thereto but which extends to the transfer point between the contacts 11 and 14 of the relay 31. Thence, through the contact 11 of the relay 31, over conductor 36 to the contact 10 of the relay 32, and through the said contact, the circuit extends to the negative bus 25.

The chain circuit connecting the relays is similar to that by which an electric light is controlled from a plurality of points.

From the above description of the operation, it will be seen that any operation of any relay, whether it is an operation which closes the contacts 10—12 or an operation which opens the same contacts, will change the condition of the circuit including the solenoid 27. It is also obvious that the notching device 26 requires two relay operations, i. e., an opening and a closing of the circuit of solenoid 27, before it is stepped around one step, since the core of solenoid 27 drops only when the winding is de-energized, and is lifted to advance the ratchet wheel 29 only upon a succeeding energization of the solenoid. If the solenoid 27 is energized and subsequently de-energized, the ratchet wheel will not be moved until the solenoid is again energized. It will be noticed also, that each relay goes through a complete cycle of operation in response to one complete revolution of the moving contact of its associated watthour meter. Since the notching device 26 requires a complete cycle of meter relay operation for the ratchet wheel 29 to be advanced one step and because the watthour meters complete a cycle of relay operation for each revolution of their moving components, the notching device 26 accurately responds to the operations of the various relays and is advanced one step for each complete revolution of any meter element. It is to be noted that the notching device 26 may be advanced one step by the closing operation of one relay and the subsequent opening operation of another or vice versa. It follows, therefore, that any two successive operations of any two meters causes the notching device 26 to be advanced one step.

The totalizing system of my invention, as illustrated, operates to totalize the readings of four banks of four meters each. As the details of the remaining banks are all identical, the description thereof is not repeated. The operations of the meters in the first bank are collected by the notching device 26 and the selector switch 16, and similar devices 40, 41 and 42 collect the operations of the meters in the second, third and fourth banks in operation with the same selector switch 16. Each of the notching devices 26, 40, 41 and 42 operates a distributor or collector switch, shown at 43 to 46, inclusive. Each of these distributor switches consists of a moving contact arm 47 and a plurality of fixed contacts 48 adapted to be engaged successively by the contact arm 47. Alternate contacts 48 are connected together, and these sets of alternate contacts are connected to a set of relays 49 to 52, inclusive. These relays are the exact counterparts of those described above in connection with the watthour meters, and each relay is controlled by its respective distributor switch in conjunction with the selector switch 16. The operation of distributor switches and the relays 49 to 52 is similar to that of watthour meters 1 to 4 and their associated relays, the distributors 43 to 46 taking the place of the contact arm 5 and the contacts 6 and 7 actuated by the watthour meters 1 to 4. The distributors 43 to 46 are employed to reduce the frequency of the impulses transmitted to a device 53 for totalizing the operations of all the meters in the system. Impulses are received by the notching device 26 at a rate proportional to the total load measured by the meters 1 to 4. Impulses are transmitted to the totalizer 53 by the distributor 43 at a lower rate, depending on the design of the notching device 26 and the distributor 43. As an example, the distributors and notching devices may be so designed that the contact arm 47 will be advanced from one segment to the next succeeding segment when the notching device 26 has been advanced three steps. In other words, the relay 52, for instance, is operated, that is to say, its coil is either energized or de-energized depending upon its previous condition, by three successive cycles of operation of the relays in the first bank. As before stated, it is not essential that all four of the relays operate, but three complete cycles of operation of any relays whatever in the first group, will serve to advance the contact arm 47 through the arc equal in length to the contact segment 48. The impulses received from the other banks of meters are similarly reduced in frequency by the distributors 44, 45 and 46, and transmitted to the relays 50, 51 and 52, to operate the totalizer 53.

The relays 49 to 52 are connected to the various distributor switches in exactly the manner that the relays 8, 30, 31 and 32 are connected to the watthour meters 1, 2, 3 and 4, and the inter-connections of the relays in both groups are the same, the relay chain, comprising the relays 49 to 52, being operated by means of the distributor switches 43—46 cooperating with the selector switch 16, to actuate a totalizing device 53 in exactly the manner that the first bank of relays controlled by the watthour meters 1 to 4 operates the notching device 26. The indication of the totalizer 53 must, of course, be multiplied by a suitable factor to obtain a result indicating the total operation of the several meters to be totalized. This factor depends upon the design of the various elements of the notching devices and distributor switches which comprise the auxiliary impulse collectors.

The selector switch 16 serves not only to totalize the four banks of meters on the totalizing devices 26, 40, 41 and 42 but also serves to totalize the said devices on the totalizer 53. The totalizer 53, as illustrated, consists simply of a ratchet-and-pawl device actuated by a solenoid and driving a set of counter wheels, but any other suitable graphic or recording device may be substituted therefor which will respond to successive current impulses.

As explained above, the selector switch 16 prevents duplication or omission of any impulse emitted by the meters, and provides for the accurate totalizing of all the meters on the totalizer 53.

Although I have illustrated my invention in connection with four banks of four meters each, it is obvious that a larger number of meters may be totalized merely by connecting a larger number in each bank and by utilizing a larger number of banks. It is apparent also that my invention may be even further extended by substituting for the totalizer 53 another auxiliary impulse collector, comprising an impulse receiver and distributor switch such, for example, as 26 and 43, respectively. The totalized reading of four sets of meters, each comprising four banks of four meters each, might thus be obtained. It is obvious, therefore, that my invention may be utilized to totalize accurately the readings of a very large number of independent meters.

Although I have illustrated and described but a single embodiment of my invention, I do not wish to be limited thereto but desire to cover as well any changes or alterations which may occur to those skilled in the art or which fall within the scope of the appended claims.

I claim as my invention:

1. A totalizing system comprising a plurality of meters, circuit-controlling means actuated thereby, a selector switch, a relay associated with each meter, said relays being connected in a chain and controlled by said circuit-controlling means and said selector switch, for controlling the circuit through said chain to a device for totalizing the operations of the meters.

2. In a totalizing system, the combination with a plurality of meters arranged in groups, of a selector switch, and a plurality of relays connected in chains corresponding to said groups, controlled by said meters and the selector switch for operating a collector device for each of said groups, and additional relays for totalizing the operations of the collector devices of all said groups, in cooperation with said selector switch.

3. A totalizing system comprising a plurality of meters and relays associated therewith, means actuated by the meters for energizing the relays, said meters and associated relays being arranged in chains, a selector switch for actuating a collector device for each chain in cooperation with the relays therein, and additional relays controlled by said collector devices for totalizing the operations of said collector devices in cooperation with said selector switch.

4. In a totalizing system, in combination, a plurality of groups of meters for measuring power, a relay associated with each meter disposed to be actuated in accordance with the amount of power measured by the meter, the relays of each meter group being connected in chain-circuit relation disposed to transmit current impulses in response to the operation of any relay in the group, a totalizing device responsive to current impulses, a relay chain operable to transmit current impulses for operating the totalizing device, and means associated with each relay chain and meter group disposed to transmit a submultiple of the impulses received from all the relay chains to control the operation of the relay chain which transmits current impulses to the totalizing device.

5. In a totalizing system, in combination, a plurality of relay chains disposed to cause the sending out of impulses in accordance with predetermined operating conditions, means for receiving the impulses from all the relay chains and transmitting a submultiple of said impulses, a totalizing device and means responsive to the submultiple of impulses for operating the totalizing device.

6. In a totalizing system, in combination, a plurality of groups of meters for measuring power, a relay chain associated with each meter group disposed to transmit impulses in accordance with predetermined operations of the meters, means responsive to the impulses of each relay chain for collecting the impulses from all the relay chains and retransmitting a submultiple of the total number of impulses received from the whole system, a totalizing device, and means responsive to the submultiple of impulses for actuating the totalizing device.

7. In a totalizing system, in combination, a plurality of meters for measuring power, a plurality of relays having contact members connected in chain-circuit relation disposed to transmit impulses responsive to the operation of any of the meters, means responsive to the impulses from said relay-chain circuit for combining a predetermined number of the received impulses and retransmitting the combined number of impulses as a single impulse, a totalizing device, and means responsive to said retransmitted impulses for actuating the totalizing device.

8. In a demand totalizing system, in combination, a plurality of meters provided with contact members, a totalizer provided with an actuating device responsive to current impulses, a relay associated with, and responsive to, the operation of the contact members of each meter, said relays being provided with contact members connected in chain-circuit relation, and means connected to the relay-chain circuit responsive to the current impulses therein resulting from the operation of the relays for collecting and retransmitting a different number of current impulses to the actuating device of the totalizer.

9. A demand totalizing system, in combination, a plurality of groups of watthour meters having rotatable contact elements, an independently operated selector switch, a relay associated with each meter disposed to be controlled by the joint operation of the selector switch and the relay contact elements, the relays of each group being connected in chain-circuit relation to provide impulse circuits, a totalizing device for all the meters, a relay chain for controlling the totalizing device, and means associated with each relay-chain circuit associated with the meters responsive to the current impulses of the circuit for controlling, in conjunction with the selector switch, the relay chain associated with the totalizing device.

10. In a metering system, in combination, a plurality of watthour meters, a relay associated with each watthour meter, said meters having contact elements disposed to control the operation of the relays in accordance with the power measured by the meters, said relays being connected in chain-circuit relation, a main totalizer provided with an actuating device responsive to current impulses, a plurality of relays connected in chain-circuit relation for controlling said actuating device, a plurality of distributor switches for controlling the operation of said relays, means responsive to current impulses in the chain-relay circuit controlled by the meters for actuating the distributor, and a selector cooperative with the distributors and the contact elements of the meters for controlling the operation of the chain relays, whereby each meter and distributor operation is rendered effective to cause current impulses in their respective relay chains.

11. A totalizing system comprising a plurality of meters, circuit-controlling means actuated by the meters, a selector switch independently operated at a speed proportional to the maximum meter speed, a relay associated with each meter, said relays having contact members connected in a plurality of chain circuits for transmitting current impulses in response to the operations of the circuit-controlling means and the selector switch, a plurality of distributor switches, means responsive to the current impulses of the relay-chain circuits for actuating the distributor switches, said distributor switches and the selector switch being operable to transmit a sub-multiple of all the impulses received from the meter relay chains, relays associated with the distributor switches connected in chain-circuit relation, said relays being responsive to the impulses transmitted by the distributor switches and the selector switch and operable to transmit impulses corresponding in number to the total submultiple impulses and a main totalizing device responsive to impulses transmitted from the distributor relay chain for totalizing the submultiple impulses.

12. In a metering system, in combination, a plurality of groups of watthour meters having circuit-controlling contact members actuated in accordance with the operation of the meter, a relay provided with contact members associated with each meter disposed to be controlled by the meter contact members, the contact members of all the relays in each group being connected in a chain circuit to provide for originating a current impulse in the circuit upon the operation of any relay, a main totalizing meter for the system, means responsive to current impulses for actuating the totalizing meter, means associated with each relay-chain circuit and responsive to the current impulses thereof for collecting and retransmitting a different number of impulses to the actuating means for the main totalizing meter than the total number of the current impulses received from the meters in each group, and independently operable means disposed to cooperate in the control of the chain relays and the actuating means for the main totalizing meter, thereby to cause each meter impulse to be effective.

13. A totalizing system comprising a plurality of meters provided with rotating switch elements, a selector switch disposed to be actuated at a speed proportional to the maximum speed of the meters, a relay associated with each meter disposed to be controlled in accordance with the operation of the meters and the selector switch, totalizing means responsive to current impulses, and means responsive to current impulses transmitted by the relays associated with the meters for collecting and retransmitting a different number of current impulses for operating the totalizing means.

14. A totalizing system comprising a plurality of watthour meters, a selector switch, a plurality of relays responsive to the operation of the meters and the selector switch for controlling an impulse circuit, means responsive to the current impulses transmitted over said circuit as a result of the operation of the relays for collecting the impulses and retransmitting a sub-multiple of the total number of received impulses, a totalizer, and means responsive to the impulses transmitted by the collecting means for operating the totalizer to totalize the power measured by all the meters.

15. The combination with a plurality of watt-hour meters having rotary contact members, of means for totalizing the operations of all the meters comprising a totalizer device responsive to current impulses, a collector switch for transmitting current impulses to the totalizer proportional in number to the total number of revolutions of the meters, an energizing circuit for the collector switch, and means controlled by the operation of the rotary contact members of the meters for opening and closing the collector switch energizing circuit in accordance with the operation of the meters.

16. A totalizing system comprising a plurality of meters, rotary contact members actuated by the meters, a chain of relays corresponding in number to the number of meters, a selector switch disposed to cooperate with the rotary contact members of the meters to effect the operation of the relays in accordance with the movements of the meters, a single circuit controlled by the relay chain and means responsive to the opening and closing of the circuit for totalizing the operations of all the meters.

17. In a totalizing system, in combination, a plurality of watthour meters having circuit-controlling contact members, a separately-actuated selector switch, a plurality of relays having their contact members connected in chain-circuit relation, operating circuits for said relays controlled by the contact members of the meters and the selector switch, a source of current connected to the chain circuit, a totalizer responsive to current impulses and distributor means actuated in accordance with the successive opening and closing of the chain circuit for collecting the total number of impulses transmitted over the chain circuit by all the meters and retransmitting a sub-multiple of the received impulses for actuating the totalizer.

In testimony whereof, I have hereunto subscribed my name this 16th day of December 1927.

GRIFFIN G. WAITE.